(12) United States Patent
Halasz et al.

(10) Patent No.: US 7,194,622 B1
(45) Date of Patent: Mar. 20, 2007

(54) NETWORK PARTITIONING USING ENCRYPTION

(75) Inventors: David E. Halasz, Stow, OH (US); Victor J. Griswold, North Canton, OH (US); Robert C. Meier, Cuyahoga Falls, OH (US); Merwyn B. Andrade, San Jose, CA (US); Richard D. Rebo, Dayton, OH (US)

(73) Assignee: Cisco Technology, Inc., San Jose, CA (US)

( * ) Notice: Subject to any disclaimer, the term of this patent is extended or adjusted under 35 U.S.C. 154(b) by 855 days.

(21) Appl. No.: 10/021,450

(22) Filed: Dec. 13, 2001

(51) Int. Cl.
*H04L 9/00* (2006.01)

(52) U.S. Cl. ............... 713/163; 713/162; 380/247; 380/277

(58) Field of Classification Search ........ 713/162–163; 380/247, 277
See application file for complete search history.

(56) References Cited

U.S. PATENT DOCUMENTS 6,307,837 B1 * 10/2001 Ichikawa et al. ........... 370/230

2001/0014088 A1 * 8/2001 Johnson et al. ............. 370/338
2003/0041266 A1 * 2/2003 Ke et al. .................... 713/201

OTHER PUBLICATIONS

Kerberos (Jan De Clercq and Micky Balladelli "Windows 2000 Authentication", Mar. 2001, Digital Press), http://www.windowsitlibrary.com/Content/617/06/2.html.*
Moore, Tim, "802.1X and 802.11 key interactions," doc:IEEE 802.11-01/610r02, (Nov. 12, 2001), http://grouper.ieee.org/groups/802/11/Documents/DocumentHolder/1-610.zip.

* cited by examiner

*Primary Examiner*—Gilberto Barron, Jr.
*Assistant Examiner*—Peter Poltorak
(74) *Attorney, Agent, or Firm*—Tucker Ellis & West LLP

(57) ABSTRACT

A system for providing a Virtual Local Area Network (VLAN) by use of an encryption states or encryption keys for identifying a VLAN. A table of data including a VLAN and an associated encryption state or key is provided for assignment of encryption states or keys, for devices in a wireless local area network.

9 Claims, 1 Drawing Sheet

NETWORK PARTITIONING USING ENCRYPTION

FIELD OF INVENTION

The present invention generally relates to a system for network partitioning, and more particularly to a system for network partitioning using encryption states and/or encryption keys.

BACKGROUND OF THE INVENTION

Local Area Networks (LANs) are generally defined as a single broadcast domain. In this regard, if a user broadcasts information on their respective LAN, the broadcast will be received by every other user on that LAN. Broadcasts are prevented from leaving a LAN by using a router. A router is an intermediate station operating as a Network Layer relay device. A router functions as a sorter and interpreter as it examines addresses and passes data to their proper destinations. Software routers may be referred to as "gateways." A bridge (or switch) is an internetworking device that relays frames among its ports based upon Data Link layer information. Unlike routers, bridges are protocol-independent. In this regard, bridges simply forward packets without analyzing and re-routing messages. Consequently, bridges are faster than routers, but are also less versatile. A router works at the Network Layer (layer 3 of the OSI model), while a bridge works at the Data Link Layer (layer 2). The Network Layer determines routing of packets of data from sender to receiver via the Data Link Layer and is used by the Transport Layer (layer 4). The most common Network Layer protocol is Internet Protocol (IP). IP is the Network Layer for the TCP/IP protocol suite widely used on Ethernet networks. IP is a connectionless, best-effort packet switching protocol that provides packet routing, fragmentation and re-assembly through the Data Link Layer.

One disadvantage of using a router as a means of preventing a broadcast from leaving a LAN is that routers usually take more time to process incoming data compared to a bridge or a switch. More importantly, the formation of broadcast domains depends on the physical connection of the devices in the network.

Virtual Local Area Networks (VLANs) provide an alternative to using routers to contain broadcast traffic. VLANs allow a LAN to be logically segmented into different broadcast domains. Accordingly, workstations do not have to be physically located together. For example, users on different floors of the same building, or users in different buildings can belong to the same LAN. VLANs also allow broadcast domains to be defined without using routers. Bridging software is used instead to define which workstations are to be included in the broadcast domain. Routers are only used to communicate between two VLANs.

VLANs offer a number of advantages over traditional LANs, including improved performance, the formation of virtual workgroups, simplified administration, reduced costs, and enhanced security.

With regard to performance, where network traffic includes a high percentage of broadcasts and multicasts, VLANs can reduce the need to send such traffic to unnecessary destinations. Moreover, the use of VLANs reduces the number of routers needed, since VLANs create broadcast domains using switches instead of routers. It should be understood that the term "switch" is used interchangeably herein with the term "bridge."

Virtual Workgroups can be easily established. To contain broadcasts and multicasts within a workgroup, a VLAN can be set up to place members of a workgroup together. There is no need to physically move members of the workgroup closer together.

Administration is also simplified by use of VLANs. In this regard, if a user is moved within a VLAN, it is not necessary to re-cable, provide new station addressing, or reconfigure hubs and routers. In addition, depending on the type of VLAN, other administrative work can be reduced or eliminated.

As to security, sensitive data may be periodically broadcast on a network. In such cases, placing only those users who can have access to that data on a VLAN can reduce the chances of an outsider gaining access to the data. VLANs can also be used to control broadcast domains, set up firewalls, restrict access, and inform the network manager of an intrusion.

Operation of a typical VLAN will now be briefly described. When a LAN bridge receives data from a workstation, it tags the data with a VLAN identifier indicating the VLAN from which the data came. This is called explicit tagging. It is also possible to determine to which VLAN the data received belongs using implicit tagging. In implicit tagging the data is not tagged, but the VLAN from which the data came is determined based on other information like the port on which the data arrived. Tagging can be based on the port from which it came, the source Media Access Control (MAC) field, the source network address, or some other field or combination of fields. To be able to do the tagging of data using any of the methods, the bridge would have to keep an updated database containing a mapping between VLANs and whichever field is used for tagging. For example, if tagging is by port, the database should indicate which ports belong to which VLAN. This database is commonly referred to as a "filtering database." Bridges would have to be able to maintain this database and all the bridges on the LAN must have consistent information in each of their databases. The bridge determines where the data is to go next based on normal LAN operations. Once the bridge determines where the data is to go, it now needs to determine whether the VLAN identifier should be added to the data and sent. If the data is to go to a device that knows about VLAN implementation (VLAN-aware), the VLAN identifier is added to the data. If it is to go to a device that has no knowledge of VLAN implementation (VLAN-unaware), the bridge sends the data without the VLAN identifier.

Standard IEEE 802.1Q provides a standard for implementation of compatible VLAN products. In accordance with this IEEE standard, VLAN membership can be classified by several means, including port, MAC address, and protocol type, as will be discussed in detail below:

(1) Layer 1 VLAN: Membership by Port

Membership in a VLAN can be defined based on the ports that belong to the VLAN. For example, in a bridge with four ports, ports 1, 2, and 4 belong to VLAN 1 and port 3 belongs to VLAN 2.

TABLE 1

| Port | VLAN |
| --- | --- |
| 1, 2, and 4 | 1 |
| 3 | 2 |

The main disadvantage of this approach is that it does not allow for user mobility. If a user moves to a different location away from the assigned bridge, the VLAN must be reconfigured.

(2) Layer 2 VLAN: Membership by MAC Address

In this case, membership in a VLAN is based on the MAC address of the workstation. The switch tracks the MAC addresses which belong to each VLAN. Since MAC addresses form a part of the workstation's network interface card, when a workstation is moved, no reconfiguration is needed to allow the workstation to remain in the same VLAN. This is unlike Layer 1 VLANs where membership tables must be reconfigured.

TABLE 2

| MAC Address | VLAN |
|---|---|
| 1212354145121 | 1 |
| 2389234873743 | 2 |
| 3045834758445 | 2 |
| 5483573475843 | 1 |

One drawback to this approach is that VLAN membership must be assigned initially. In networks with thousands of users, this is no easy task. Also, in environments where notebook PCs are used, the MAC address is associated with the docking station and not with the notebook PC. Consequently, when a notebook PC is moved to a different docking station, its VLAN membership must be reconfigured.

(3) Layer 2 VLAN: Membership by Protocol Type

VLAN membership for Layer 2 VLANs can also be based on the protocol type field found in the Layer 2 header.

TABLE 3

| Protocol | VLAN |
|---|---|
| IP | 1 |
| IPX | 2 |

(4) Layer 3 VLAN: Membership by IP Subnet Address

In this case, membership is based on the Layer 3 header. The network IP subnet address can be used to classify VLAN membership.

TABLE 4

| IP Subnet | VLAN |
|---|---|
| 23.2.24 | 1 |
| 26.21.35 | 2 |

Although VLAN membership is based on Layer 3 information, this has nothing to do with network routing and should not be confused with router functions. In this method, IP addresses are used only as a mapping to determine membership in VLANs. No other processing of IP addresses is done. In Layer 3 VLANs, users can move their workstations without reconfiguring their network addresses. A notable drawback is that an IEEE 802.11 station may not generate an IP packet each time that it roams.

(5) Higher Layer VLANs

It is also possible to define VLAN membership based on applications or service, or any combination thereof. For example, file transfer protocol (FTP) applications can be executed on one VLAN and telnet applications on another VLAN. The 802.1Q draft standard defines Layer 1 and Layer 2 VLAN's only. Protocol type based VLAN's and higher layer VLAN's have been allowed for, but are not defined in this standard. As a result, these VLAN's will remain proprietary.

Devices on a VLAN can be connected in three ways (i.e., trunk link, access link, and hybrid link) based on whether the connected devices are VLAN-aware or VLAN-unaware. As noted above, VLAN-aware device is one which understands VLAN memberships (i.e. which users belong to a VLAN) and VLAN formats. All the devices connected to a trunk link, including workstations, must be VLAN-aware. All frames on a trunk link must have a special header attached. These special frames are called tagged frames. An access link connects a VLAN-unaware device to the port of a VLAN-aware bridge. All frames on access links must be implicitly tagged (untagged). The VLAN-unaware device can be a LAN segment with VLAN-unaware workstations or it can be a number of LAN segments containing VLAN-unaware devices (legacy LAN). A hybrid link is a combination of the previous two links. This is a link where both VLAN-aware and VLAN-unaware devices are attached. A hybrid link can have both tagged and untagged frames, but all the frames for a specific VLAN must be either tagged or untagged. It should also be understood that a network can have a combination of all three types of links.

It should be appreciated that VLANs have long been used in wired networks, which are typically static networks. Furthermore, wired networks use a wired switch, wherein broadcasts are segmented by physical wire. In contrast, implementation of VLANs in wireless networks has been limited by the fact that these networks are dynamic, and that broadcast domains must be segmented. Accordingly, the present invention addresses the limitations of the prior art to provide a system for partitioning a network using encryption states and/or encryption keys, as a means for establishing a VLAN in a wireless communication environment.

SUMMARY OF THE INVENTION

According to the present invention there is provided a system for network partitioning in a network environment using encryption.

An advantage of the present invention is the provision of a system for network partitioning which is suitable for a dynamically changing network environment.

Another advantage of the present invention is the provision of a system for network partitioning which is suitable for a wireless network environment.

Another advantage of the present invention is the provision of a system for network partitioning which segments broadcasts.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
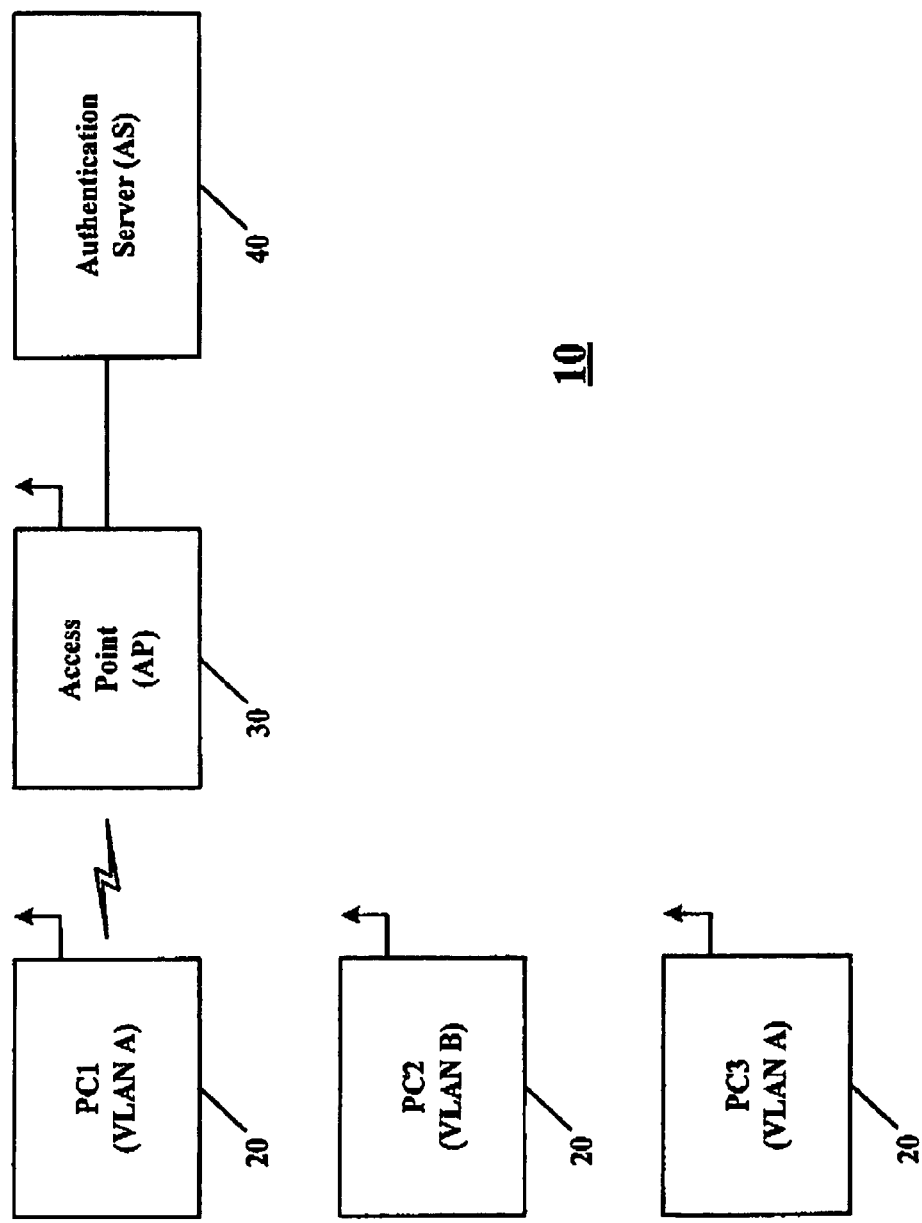
FIG. 1 illustrates an exemplary wireless network environment.

Referring now to the drawings wherein the showings are for the purposes of illustrating a preferred embodiment of the invention only and not for purposes of limiting same, FIG. 1 illustrates an exemplary wireless network 10 comprised of a plurality of data processing devices 20 (PC1, PC2 and PC3), an access point 30 and an authentication server 40. It should be appreciated that the number of each element shown in wireless network 10 is for illustration purposes only, and is not intended to limit same. For instance, there may be several more data processing devices and access points. Moreover, the wireless network may also include other typical network elements.

Data processing devices 20 typically take the form of a portable or mobile unit, including but not limited to: a notebook PC, handheld personal digital assistant (PDA), and the like. However, data processing devices 20 may also take the form of generally stationary devices, such as a desktop PC. In an authentication process described below, data processing devices 20 take the role of supplicants, which is an entity at one end of a point-to-point LAN segment that is being authenticated by an authenticator attached to the other end of that link.

Access point (AP) 30 is a base station for communicating with one or more data processing devices via a wireless link. In the authentication process described below, access point (AP) 30 takes the role of an authenticator. An authenticator is an entity at one end of a point-to-point LAN segment that requires to authenticate the entity attached to the other end of that link.

Authentication server 40 is an entity that provides an authentication service to an authenticator. The service determines, from the credential provided by the supplicant, whether the supplicant is authorized to access the services provided by the authenticator. It should be understood that the authentication server function can be co-located with the authenticator, or can be remotely accessed via a network to which the authenticator has access.

The Upper Layer authentication model controls the flow of packets between the "distribution system" (DS) and unauthorized stations by use of a controlled/uncontrolled port model. Per the model, stations are allowed to associate with IEEE 802.11 Open authentication so as to allow the network-level authentication process. Authentication packets (contained in IEEE 802.11 MAC data frames) are passed via the IEEE 802.1X uncontrolled port.

Nonauthentication packets are passed (or blocked) via the controlled port. Each association between a pair of stations would create a unique 802.1X "port" and authentication takes place relative to that port alone. The association exists only for a period of time sufficient for authorization to take place. Should authorization not be completed within that time, the station will be disassociated.

The present invention uses encryption states or encryption keys of a wireless link to dynamically assign a VLAN identifier (e.g., an 802.1Q "VLAN ID"). In this regard, broadcast/multicast traffic is segmented by usage of assigning distinct encryption states or encryption keys being transmitted on each 802.1Q VLAN ID. It should be appreciated that in accordance with alternative embodiments of the present invention, other properties of the wireless link are also suitably used to provide a VLAN ID. These properties include, but are not limited to, MAC address, username/password credentials of the user, wireless system identifier, or other properties of the wireless link. The present invention provides a means for segmenting broadcast/multicast traffic on a network.

For example, in a case where VLANs are provided to accommodate a private network and a public network, the present invention may be implemented wherein the private VLAN ID broadcast/multicast traffic is transmitted encrypted, while the public access broadcast/multicast traffic is transmitted without encryption. In a case where multiple private VLANs are to be used, distinctly different encryption keys can be used to encrypt the broadcast/multicast traffic.

Enterprise networks are often divided into "subnets," where computers or "hosts" are associated with a single "home subnet". There is a one-to-one correspondence between a Network Layer (layer 3) subnet and a Data Link Layer (layer 2) "broadcast domain." In general, hosts would not "roam" to a different remote subnet because packets (also referred to herein as "frames") for the host will not be routed/bridged to the remote subnet.

The IEEE 802.1Q Virtual LAN (VLAN) protocol can be used to logically extend the home subnet, for a host, to a port on a remote subnet in the same enterprise network. It can also be used to divide a single physical broadcast domain into multiple logical broadcast domains, so that hosts from different subnets can share a single (i.e., 802.11) broadcast link.

An 802.1Q "VLAN ID" is used to identify each "home subnet". A 12-bit 802.1Q VLAN ID field is added to data link frames that are transmitted on VLAN links used for multiple subnets (i.e. trunk or hybrid links). The VLAN ID effectively limits the broadcast/multicast domain. Broadcast frames are only forwarded to those hosts and switch ports associated with the VLAN ID. It should be appreciated that, as used herein, the term "broadcast" can be understood to include broadcast, multicast and any other means for sending packets to a group of recipients.

A VLAN ID is typically assigned to a host in one of the following ways: a) A non-mobile host attached to a switch port can implicitly use the "native VLAN ID" assigned to the switch port; b) a VLAN-aware host can be configured with a VLAN ID; c) a network administrator can configure a list of 802 addresses and associated VLAN IDs; or, d) a network administrator can configure a list of VLAN IDs and associated IP addresses and/or IP subnets, e.g. a mobile IP subnet.

VLAN roaming is limited to an enterprise network because the 12-bit VLAN ID, assigned to a host, is only valid within the context of an enterprise network. The assigned VLAN ID is not valid if a "mobile host" roams to a "foreign subnet" in a foreign enterprise or public access network. The mobile host does not belong to any subnet in the foreign network and it is generally impractical to statically configure VLAN IDs for such "guest hosts".

In accordance with a preferred embodiment of the present invention, a different shared WEP key is used to identify a VLAN, rather than a VLAN ID. WEP refers to Wired Equivalency Protocol, which is an IEEE 802.11 encryption protocol that can be used for each broadcast domain to encrypt broadcast/multicast frames. WEP (Wired Equivalency Protocol, Wireless Encryption Protocol). WEP encrypts network traffic with a WEP key shared by all devices on the same wireless LAN. Of course, it is to be appreciated that WEP is only one exemplary type of encryption algorithm and that any other suitable type of encryption algorithm could also be used, without departing from the invention.

With reference to FIG. 1, the steps for using a WEP broadcast key to provide a VLAN identifier will be described. When it is desired to "ASSOCIATE" a data processing device 20 (e.g., PC1) with AP 30, PC1 will request a point-to-point key or session key (i.e., directed traffic key). AS 40 will then determines whether PC1 is allowed to access to the network, and will provide a session key to data processing device via uncontrolled traffic port of AP 30, if access is granted. The session key is device specific. If access is granted, AS 40 will also transmit data to AP 30 identifying which VLAN should be associated with PC1. A table of data associating a VLAN with a broadcast or multicast key is stored in AP 30. An appropriate broadcast key is transmitted to PC1 in accordance with the identified VLAN received from AS 40. The broadcast key will be encrypted by AP 30 using the session key. After PC1 receives the broadcast key, communication by PC1 on the network may commence.

It should be understood that AP 30 stores a table of data associating a VLAN with a particular broadcast key. In this regard, each VLAN may be associated with a different broadcast key. The table of broadcast keys may be manually or automatically entered into the memory of AP 30. AP 30 may classify stations (e.g., PC1) into different broadcast domains and dynamically assign a broadcast key for each broadcast domain.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

What is claimed is:

1. A method for servicing a Virtual Local Area Network (VLAN) comprising:
    maintaining a table associating broadcast keys with VLANs at an access point;
    receiving a request for access to a network from a wireless station by the access point;
    authenticating the wireless station with an authentication server responsive to the request by the access point;
    responsive to receiving from the authentication server data identifying a VLAN for the wireless station by the access point
    accessing the table maintained at the access point to determine an appropriate broadcast key for the VLAN identified by the authentication server; and
    transmitting the appropriate broadcast key to the wireless station by the access point.

2. The method of claim 1 further comprising the step of using a separate broadcast key associated with each VLAN to encrypt the data.

3. The method of claim 1 wherein the wireless station operates in accordance with the IEEE 802.11 standard.

4. The method of claim 1 wherein the VLAN comprises a mobile IP subnet.

5. The method of claim 4 further comprising a step of tagging data to determine to which VLAN the data belongs.

6. A system comprising:
    a first access point, the first access point configured with a first table for associating a first set of encryption keys with Virtual Local Area Networks (VLANs);
    a second access point, the second access point configured with a second table for associating a second set of encryption keys with VLANs;
    an authentication server communicatively coupled to the first access point and the second access point;
    wherein the first access point responsive to an association request from a wireless station authenticates the wireless station with the authentication server, the first access point receiving data from the authentication server identifying a VLAN associated with the wireless station, the first access point being responsive to receiving the data identifying the VLAN associated with the wireless station to access the first table and determine a first broadcast encryption key from the first set of encryption keys for the VLAN associated with the wireless station and the first access point is configured to communicate the first broadcast encryption key to the wireless station; and
    wherein the second access point responsive to an association request from the wireless station authenticates the wireless station with the authentication server, the second access point receiving data from the authentication server identifying the VLAN associated with the wireless station, the second access point being responsive to receiving the data identifying the VLAN associated with the wireless station to access the second table and determine a second broadcast encryption key from the second set of encryption keys for the VLAN associated with the wireless station and the second access point is configured to communicate the second broadcast encryption key to the wireless station.

7. A system according to claim 6, wherein the first access point is configured to dynamically assign an encryption key as the first broadcast encryption key for the VLAN associated with the wireless station.

8. A system according to claim 6, wherein the first access point receives a session key for the wireless station from the authentication server, the first access point is responsive to encrypt the first broadcast encryption key with the session key prior to communicating the first broadcast encryption key to the wireless station.

9. A system according to claim 6, the first access point is responsive to receiving one of a group consisting of a broadcast packet and a multicast packet for the VLAN associated with the wireless station to transmit the one of the group consisting of the broadcast packet and the multicast encrypted with the first broadcast key.

* * * * *